US011736646B2

(12) United States Patent
Azimi (10) Patent No.: US 11,736,646 B2
(45) Date of Patent: Aug. 22, 2023

(54) SYSTEM AND METHOD FOR MULTI-LAYERED WATERMARKING

(71) Applicant: DIGITAL MOBILITY INC., North York (CA)

(72) Inventor: Amir Azimi, Veldhoven (NL)

(73) Assignee: DIGITAL MOBILITY INC., North York (CA)

( * ) Notice: Subject to any disclaimer, the term of this patent is extended or adjusted under 35 U.S.C. 154(b) by 85 days.

(21) Appl. No.: 17/401,941

(22) Filed: Aug. 13, 2021

(65) Prior Publication Data

US 2022/0053105 A1 Feb. 17, 2022

Related U.S. Application Data

(60) Provisional application No. 63/065,049, filed on Aug. 13, 2020.

(51) Int. Cl.
*H04N 1/32* (2006.01)
*G06T 1/00* (2006.01)

(52) U.S. Cl.
CPC ......... *H04N 1/3232* (2013.01); *G06T 1/0071* (2013.01); *H04N 2201/3233* (2013.01)

(58) Field of Classification Search
CPC .................................... H04N 1/32144–32352
See application file for complete search history.

(56) References Cited

U.S. PATENT DOCUMENTS

| | | | |
|---|---|---|---|
| 7,152,047 B1* | 12/2006 | Nagel | G06K 19/086 705/76 |
| 2011/0037248 A1* | 2/2011 | Howland | B42D 25/29 283/57 |

* cited by examiner

*Primary Examiner* — Barbara D Reinier
(74) *Attorney, Agent, or Firm* — Bhole IP Law; Anil Bhole; Marc Lampert (57) ABSTRACT

There is provided systems and methods for generating a multi-layered watermark. The watermark incorporating one or more symbols for placement on a document. The method including: positioning a base layer of the watermark at one or more locations on the document; positioning the one or more symbols overtop of at least a portion of the base layer; and positioning a braid layer of the watermark overtop of the ID, the braid layer and the base layer are substantially aligned, the braid layer including a copy of the base layer incorporating a pattern. The pattern can include one or more of discolorations, holes, and sections of increased opacity.

20 Claims, 11 Drawing Sheets

SYSTEM AND METHOD FOR MULTI-LAYERED WATERMARKING

TECHNICAL FIELD

The following relates to counterfeit and forgery protection; and more specifically, to a method and system for multi-layered watermarking.

BACKGROUND

Certain documents require knowledge that the symbols on them are authentic; for example, for legal or evidentiary purposes, as well as in other circumstances. In an example, documents, such as reports and notes by police officers or detectives, are used in court, but there is a risk that these documents have been tampered. In another example, cheques require that the sum printed on them has not been altered to extract more from an account than intended.

SUMMARY

In an aspect, there is provided a computer-implemented method for generating a multi-layered watermark with one or more symbols for placement on a document, the method comprising: positioning a base layer of the watermark at one or more locations on the document; positioning the one or more symbols of the watermark overtop of at least a portion of the base layer; positioning a braid layer of the watermark overtop of the ID, the braid layer and the base layer are substantially aligned, the braid layer comprising a copy of the base layer incorporating a pattern; and outputting the watermark.

In a particular case of the method, the base layer and the braid layer comprise multiple lines together forming a wavy design.

In another case of the method, the base layer and the braid layer comprise multiple lines together forming a braided design.

In yet another case of the method, the pattern comprises a plurality of holes or areas of opacity positioned in association with each of the one or more symbols.

In yet another case of the method, the holes or areas of opacity are positioned over only a portion of each of the symbols.

In yet another case of the method, the design comprises the base layer and the braid layer forming alternating lines of the wavy design.

In yet another case of the method, the pattern comprises discoloration positioned in association with each of the one or more symbols.

In yet another case of the method, the method further comprising positioning at least one further braid layer of the watermark overtop of the ID.

In yet another case of the method, the method further comprising generating and positioning a machine-readable optical encoding on the document, the machine-readable optical encoding comprising a hashed encoding of the one or more symbols, the hashed encoding usable to authenticate validity of the watermark by matching the symbols to the encoded symbols in the machine-readable optical encoding.

In yet another case of the method, the method further comprising digitally flattening the base layer, the one or more symbols, and the braid layer.

In another aspect, there is provided a system for generating a multi-layered watermark with one or more symbols for placement on a document, the system comprising one or more processors in communication with a data storage to receive instructions to execute a watermark module to: position a base layer of the watermark at one or more locations on the document; position the one or more symbols of the watermark overtop of at least a portion of the base layer; position a braid layer of the watermark overtop of the ID, the braid layer and the base layer are substantially aligned, the braid layer comprising a copy of the base layer incorporating a pattern; and output the watermark.

In a particular case of the system, the base layer and the braid layer comprise multiple lines together forming a wavy design.

In another case of the system, the base layer and the braid layer comprise multiple lines together forming a braided design.

In yet another case of the system, the pattern comprises a plurality of holes or areas of opacity positioned in association with each of the one or more symbols.

In yet another case of the system, the holes or areas of opacity are positioned over only a portion of each of the symbols.

In yet another case of the system, the design comprises the base layer and the braid layer forming alternating lines of the wavy design.

In yet another case of the system, the pattern comprises discoloration positioned in association with each of the one or more symbols.

In yet another case of the system, the watermark module further positions at least one further braid layer of the watermark overtop of the ID.

In yet another case of the system, the one or more processors further executes a coding module to generate and position a machine-readable optical encoding on the document, the machine-readable optical encoding comprising a hashed encoding of the one or more symbols, the hashed encoding usable to authenticate validity of the watermark by matching the symbols to the encoded symbols in the machine-readable optical encoding.

In yet another case of the system, the watermark module further digitally flattens the base layer, the one or more symbols, and the braid layer.

These and other aspects are contemplated and described herein. The foregoing summary sets out representative aspects of systems and methods to assist skilled readers in understanding the following detailed description.

DESCRIPTION OF THE DRAWINGS

An embodiment of the present invention will now be described by way of example only with reference to the accompanying drawings, in which.

DETAILED DESCRIPTION

Embodiments will now be described with reference to the figures. It will be appreciated that for simplicity and clarity of illustration, where considered appropriate, reference numerals may be repeated among the figures to indicate corresponding or analogous elements. In addition, numerous specific details are set forth in order to provide a thorough understanding of the embodiments described herein. However, it will be understood by those of ordinary skill in the art that the embodiments described herein may be practiced without these specific details. In other instances, well-known methods, procedures and components have not been described in detail so as not to obscure the embodiments described herein. Also, the description is not to be considered as limiting the scope of the embodiments described herein.

It will also be appreciated that any module, unit, component, server, computer, computing device, mechanism, terminal or other device exemplified herein that executes instructions may include or otherwise have access to computer readable media such as storage media, computer storage media, or data storage devices (removable and/or non-removable) such as, for example, magnetic disks, optical disks, or tape. Computer storage media may include volatile and non-volatile, removable and non-removable media implemented in any method or technology for storage of information, such as computer readable instructions, data structures, program modules, or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by an application, module, or both. Any such computer storage media may be part of the device or accessible or connectable thereto. Any application or module herein described may be implemented using computer readable/executable instructions that may be stored or otherwise held by such computer readable media and executed by the one or more processors.

The following relates to document identification; and more specifically, to a method and system for multi-layered watermarking.

When documents require authenticity, such reports and notes by police officers or detectives that are used in court, there is a risk that these documents can be tampered. In order to ensure authenticity, watermarks can be embedded or otherwise associated with the documents. Watermarks are a type of identification that can be printed on documents or embedded in video or image data. Watermarks generally are located below or on-top of the actual data that is to be protected. Generally, placing a watermark either near the center of a document as a background layer, which may not necessarily be beneath the data that needs to be protected In other cases, watermarks are placed directly over the data (such as an image) that needs to be protected. In many cases, documents which have a watermark embedded may still be tamperable. Even in some cases where the information on the document cannot be altered, unique ID or codes printed on the document as a watermark can be altered.

Advantageously, embodiments of the present disclosure provide technological approaches for determining if a document which bears a unique identification has been tampered. In an example, the identification of the present embodiments can be used by court systems and law enforcement agencies. In another example, the identification of the present embodiments can be used by financial institutions or credit reporting agencies to avoid manipulation of documents. In further examples, the identification of the present embodiments can be used by any private or public entity with a need to be able to determine if a document which bears a unique identification has been tampered. In some cases, the identification of the present embodiments can be a standalone feature or be used as part of a larger multi-layered security feature, for example, M.S.S (Manifold Security Structure).

Figure 3:
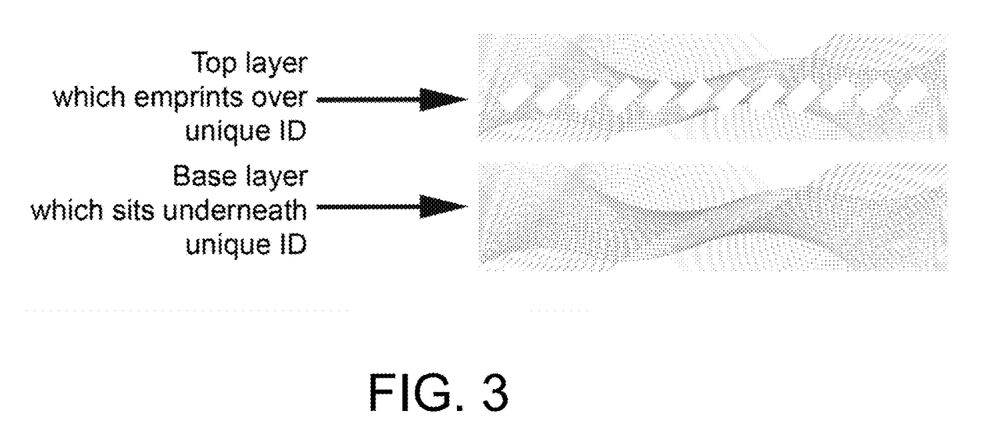
FIG. 3 is an example of a braid layer and base layer of a multi-layer watermark.
Figure 4:
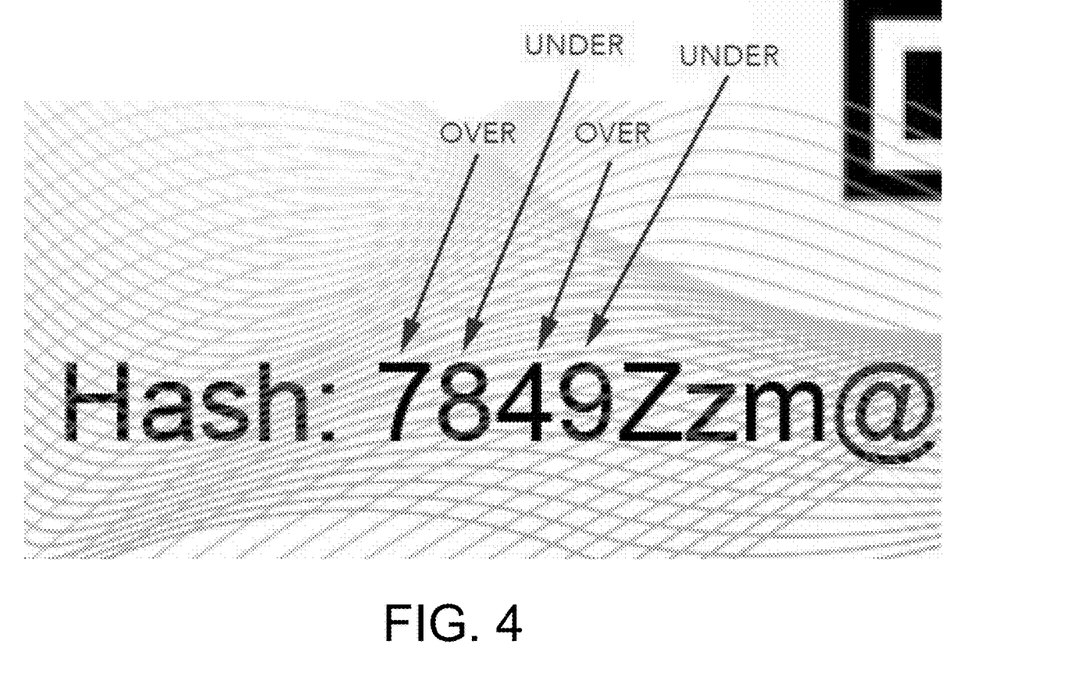
FIG. 4 is an example of a compiled multi-layer watermark.

Embodiments of the present disclosure provide a multi-layered watermark that incorporates multiple layers with one or more symbols on a document. In an embodiment, as illustrated in the example of FIG. 3, the multi-layered watermark comprises three layers: a first layer comprising a base layer watermark, a second layer comprising a string of characters as the symbols, and a third layer comprising a copy of the watermark. The third layer is broken up into patterns that allow the characters to have an appearance that the watermark is weaving in and out of the characters, as illustrated in the example of FIG. 4.

Figure 1:
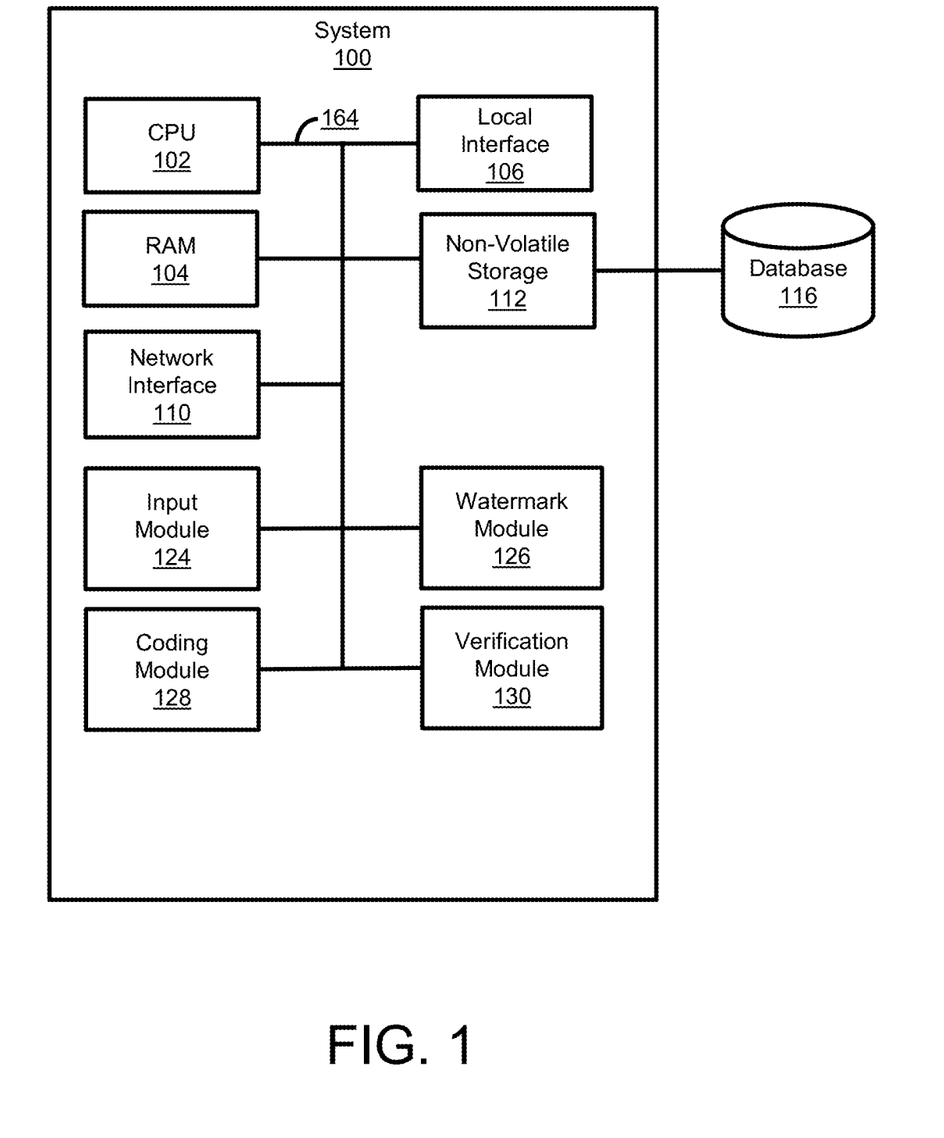
FIG. 1 is a conceptual diagram of a system for multi-layered watermarking, according to an embodiment.

Turning to FIG. 1, shown is a diagram of a system 100 for multi-layered watermarking, according to an embodiment. In this embodiment, the system 100 is run on a single computing device. In further embodiments, the functions of the system 100 can be distributed among two or more computer systems that may be locally or remotely distributed; for example, using cloud-computing resources.

FIG. 1 shows various physical and logical components of an embodiment of the system 100. As shown, the system 100 has a number of physical and logical components, including a central processing unit ("CPU") 102 (comprising one or more processors), random access memory ("RAM") 104, a local interface 106, a network interface 110, non-volatile storage 112, and a local bus 114 enabling CPU 102 to communicate with the other components. CPU 102 executes an operating system, and various modules, as described below in greater detail. RAM 104 provides relatively responsive volatile storage to CPU 102. The local interface 106 enables an administrator or user to provide input via an input device, for example, a mouse or a touchscreen. The local interface 106 can also outputs information to output devices; for example, a printer or display. The network interface 110 permits communication with a network or other computing devices and servers remotely located from the system 100. Non-volatile storage 112 stores the operating system and programs, including computer-executable instructions for implementing the operating system and modules, as well as any data used by these services. Additional stored data can be stored in a database 116. During operation of the system 100, the operating system, the modules, and the related data may be retrieved from the non-volatile storage 112 and placed in RAM 104 to facilitate execution.

In an embodiment, the system 100 further includes a number of conceptual modules to be executed on the one or more processors 102, including an input module 124, a watermark module 126, a coding module 128, and a verification module 130.

Figure 2:
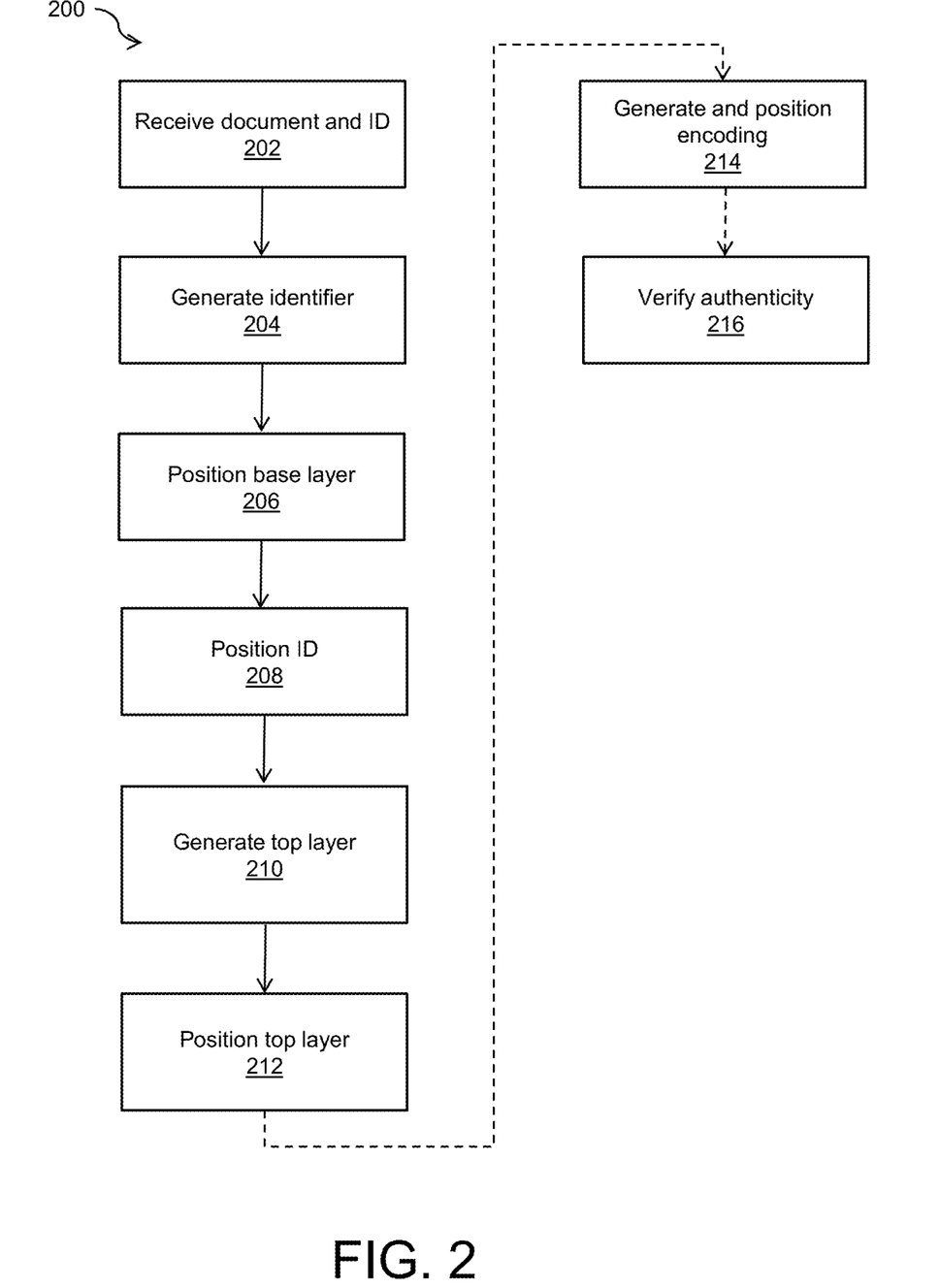
FIG. 2 is a flow chart for a method for multi-layered watermarking, according to an embodiment.

FIG. 2 illustrates a flow diagram of a method 200 for multi-layered watermarking, according to an embodiment.

At block 202, the input module 124 receives a document that is to receive a watermark and one or more symbols that are to be on the document and are to be protected. In an example, the one or more symbols can be a string of alphanumeric characters, such as those comprising a hash of an identifiable code. In other cases, the one or more symbols can be, for example, a series of images, a series of other characters, a barcode, a Quick Response (QR) code, or the like. In further examples, the one or more symbols can be anything suitable to be placed on a document. In some cases, the one or more symbols can be placed in multiple positions on multiple pages of the document.

In other cases, the watermark module 126 can generate the one or more symbols, for example, an identification number upon activation, receipt, or creation of the document (for example, when a user starts a report).

At block 204, the watermark module 126 generates a watermark. In an example, the watermark can be an image as comprising braided or wavy lines; as exemplified in FIGS. 5 to 9. The present inventors have determined through experimentation that braided or wavy lines allow for easier legibility of alphanumeric IDs makes it more difficult to alter and/or forge.

The layers of the watermark can be stored in any suitable format, for example, as 'png' files, stored on the database 116 or stored remotely accessed via the network interface 110. While the present embodiments describe a two-layer watermark, it is appreciated that any suitable number of base layers and/or braid layers can be used.

At block 206, the watermark module 126 positions a base layer of the watermark at one or more predetermined locations on the document. In an example, the predetermined location can be in a header or footer of the document on one or more pages.

At block 208, the watermark module 126, at each location of the base layer, positions the one or more symbols overtop of at least a portion of the base layer.

At block 210, the watermark module 126 generates a braid layer (also referred to as a braid layer) of the watermark. The braid layer comprises a copy of the watermark with a pattern comprising one or more of discolorations, holes, and opacity. In some cases, the patterns can be generated based on the data that needs to be protected. For example, when there is a need to protect symbols of various sizes, a number of watermarks can be generated, each with different dimensions. Then, when a string of symbols that consists of, for example, 50 characters is used, the watermark relevant to those dimensions can be used.

At block 212, at each location of the base layer, the watermark module 126 positions the braid layer overtop of at least a portion of the one or more symbols such that the braid layer and the base layer are substantially aligned, such that the lines of the braid layer are more or less visually perceptible as overtop of the lines of the base layer. In some cases, the base layer, the one or more symbols, and the braid layer can be digitally flattened, such as forming a flattened image, such that they are no longer separable. In other cases, the base layer, the one or more symbols, and the braid layer can be printed and thus not separable.

In some cases, at block 214, at a location near or adjacent to one or more of the base layers, the coding module 128 generates a machine-readable optical encoding (e.g., a barcode or QR code) that is associated with the one or more symbols and positions the encoding on the associated page of the document. In some cases, if the document is multiple pages, the machine-readable optical encoding code can be located either on the first page, last page, or first and last pages.

The machine-readable optical encoding can be used as a secondary verification of the authenticity of the document. For example, to verify authenticity of the document with a QR code, a user with a QR scanner can scan the QR code, which is a hashed encoding of the string of alphanumeric characters comprising the one or more symbols. Then, the hashed encoding can be used to query the database or remote server for the original document. In another example, a unique string (comprising a hash) with the multi-layer watermark can be printed onto a credit report. If a bad actor manipulates his/her printed credit report and gives it to another party (for example, to a landlord), the other party questioning the validity of the credit report can scan the QR code, make sure it matches the unique string, and send the hash to the credit reporting agency to authenticate validity.

In some cases, at block 216, a user can manually verify the authenticity of the multi-layered watermark by visually ensuring the lines are spaced accordingly and/or matching the base and braid layers with a previously received template. In other cases, at block 216, the verification module 130 determines the authenticity of the document using the multi-layered watermark and outputs such determination. In some cases, the verification can include ensuring the one or more symbols matches the string encoded by the machine-readable optical encoding. The verification module 130 can be executed on a computing device that is the same or separate from the device executing the other modules.

With current technology, there is an ease of manipulation of data printed onto a document or kept in digital format. The multi-layer watermark, for example, providing a braided image weave with the one or more symbols makes it extremely difficult for a bad actor to alter as such manipulation would be immediately noticeable by the verification module 130 or by a person; for example, because the lines would be noticeably off relative to adjacent lines. Additionally, such braiding can make it much more difficult for a bot of a bad actor to read and identify content, helping to obscure the one or more symbols from the bot.

Advantageously, a watermark with braided wavy lines can allow for more secure coverage over the one or more symbols. If the lines are merely horizontal or vertical, their braiding on alphanumeric data can be missed as a large portion of alphanumeric characters consist of straight lines.

In some cases, portions of the method 200 can be integrated into other programs, such as a word processor or a portable document format (PDF) application. In such cases, the system 100 generates the multi-layered watermark, as above, and outputs it as an image to be included into the document by the other program.

Figure 5A:
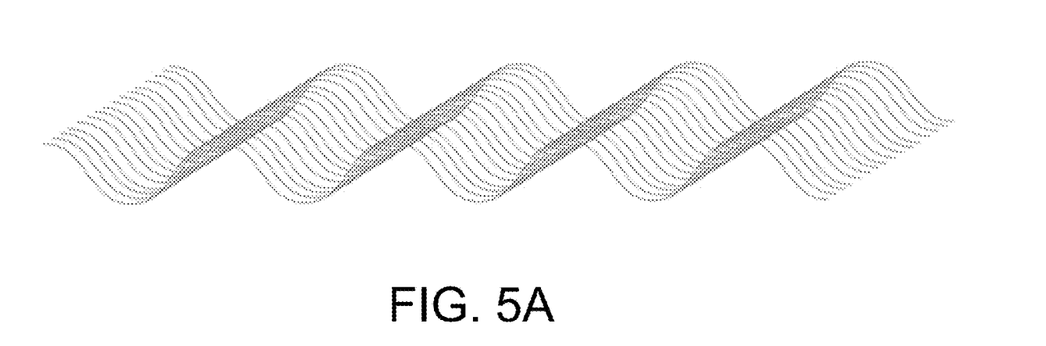
FIG. 5A is another example of a braid layer of a multi-layer watermark.
Figure 5B:
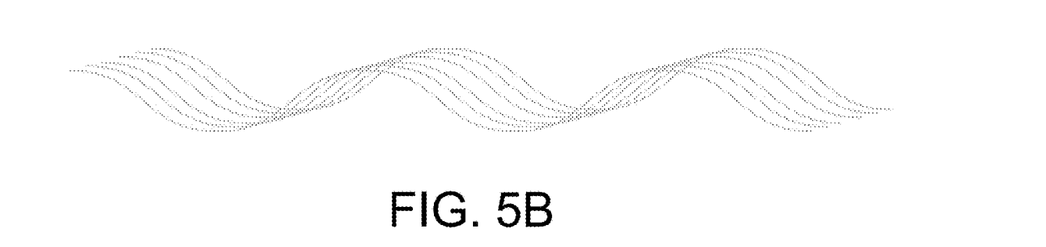
FIG. 5B is another example of a base layer of the multi-layer watermark.
Figure 5C:
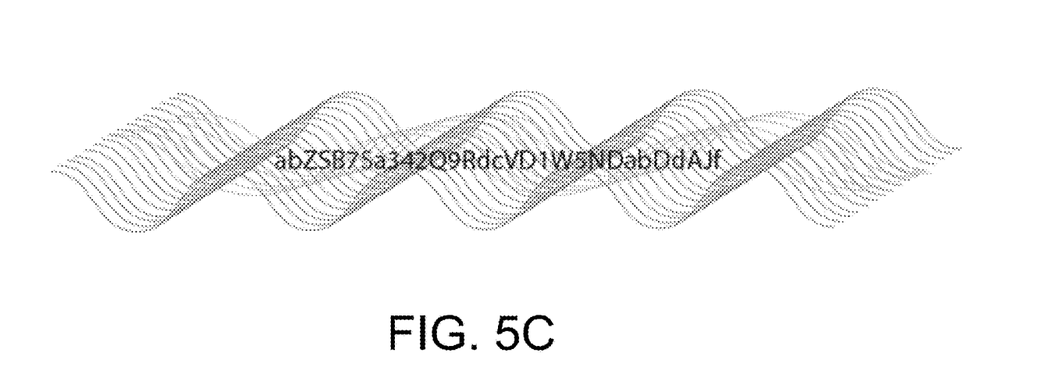
FIG. 5C is another example of a compiled multi-layer watermark using the layers in FIGS. 5A and 5B.

FIGS. 5A to 5C illustrate an example of the multi-layered watermark described herein. FIG. 5A illustrates a base layer in this example that will act as a background with the ID (i.e., data to be protected) positioned on top and centered. FIG. 5B illustrates a braid layer in this example that has an opacity of 65% and is positioned over top of the one or more symbols. FIG. 5C illustrates a compiled version of the multi-layered watermark of this example.

Figure 6A:
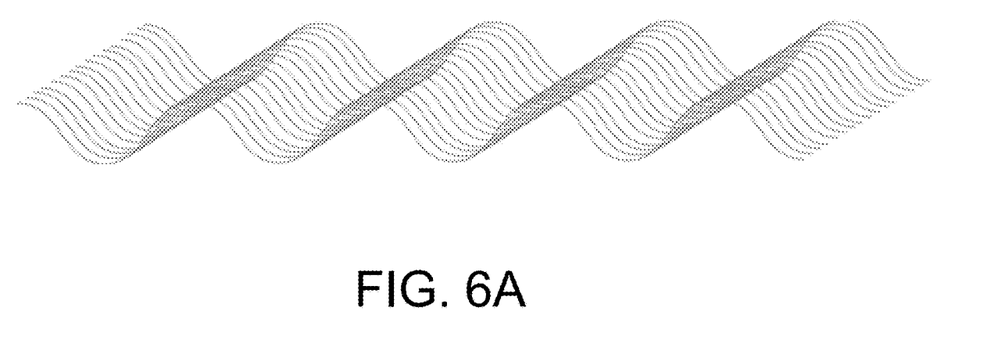
FIG. 6A is another example of a braid layer of a multi-layer watermark.
Figure 6B:
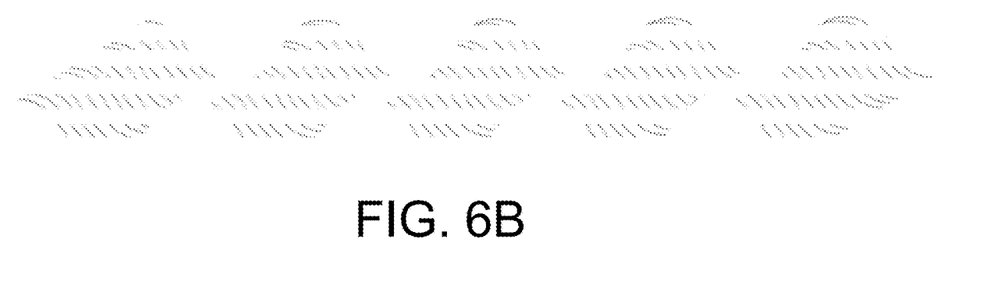
FIG. 6B is another example of a base layer of the multi-layer watermark.
Figure 6C:
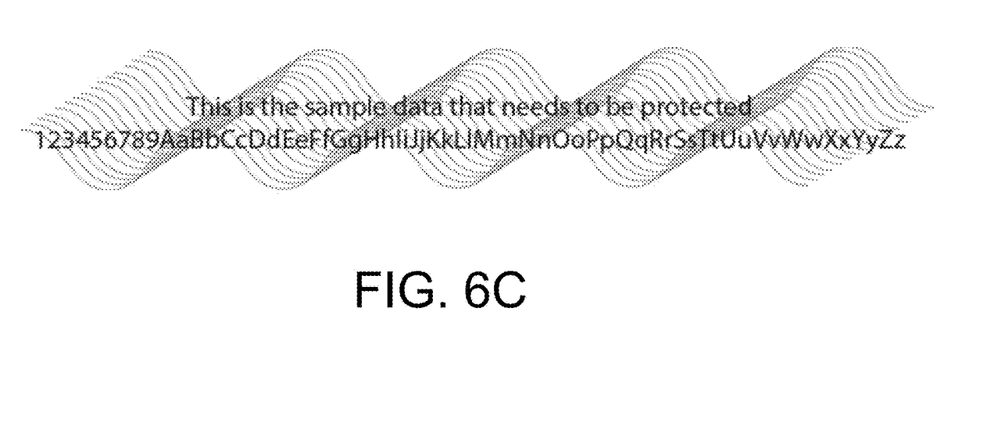
FIG. 6C is another example of a compiled multi-layer watermark using the layers in FIGS. 6A and 6B.

FIGS. 6A to 6C illustrate another example of the multi-layered watermark described herein. FIG. 6A illustrates a base layer in this example that will act as a background with the one or more symbols (i.e., data to be protected) positioned on top and centered. FIG. 6B illustrates a braid layer in this example that has an opacity of 50% and has holes comprising horizontal voids. The braid layer is positioned over top of the one or more symbols. Horizontal voids are particularly useful for larger strings of symbols, creating an illusion that the watermark is braided between the characters. Horizontal voids can make it more challenging for the one or more symbols to be altered. If the data comprising the one or more symbols is large, and only covered by a small braiding, it is possible that the smaller area is more susceptible to be altered. Horizontal voids can allow for, for example, 3 or 4 times the amount of braid lines to go over and under the one or more symbols. FIG. 6C illustrates a compiled version of the multi-layered watermark of this example.

Figure 7A:
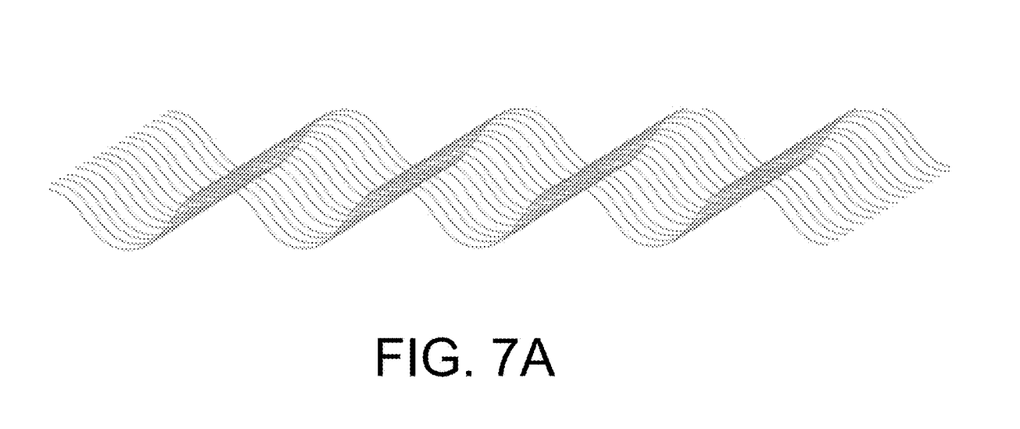
FIG. 7A is another example of a braid layer of a multi-layer watermark.
Figure 7B:
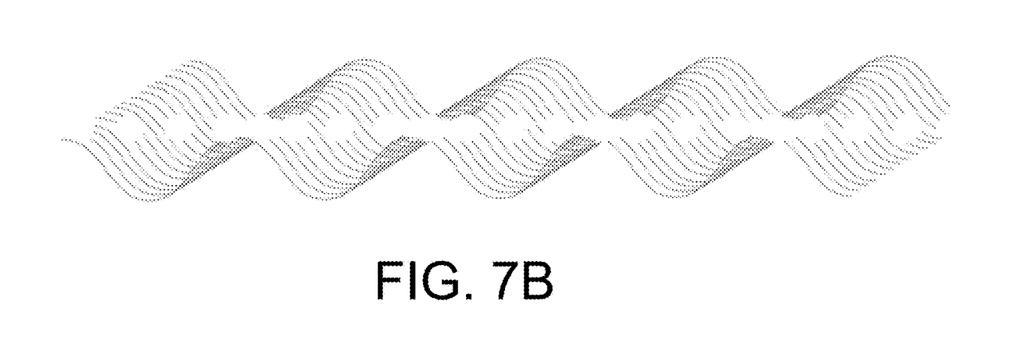
FIG. 7B is another example of a base layer of the multi-layer watermark.
Figure 7C:
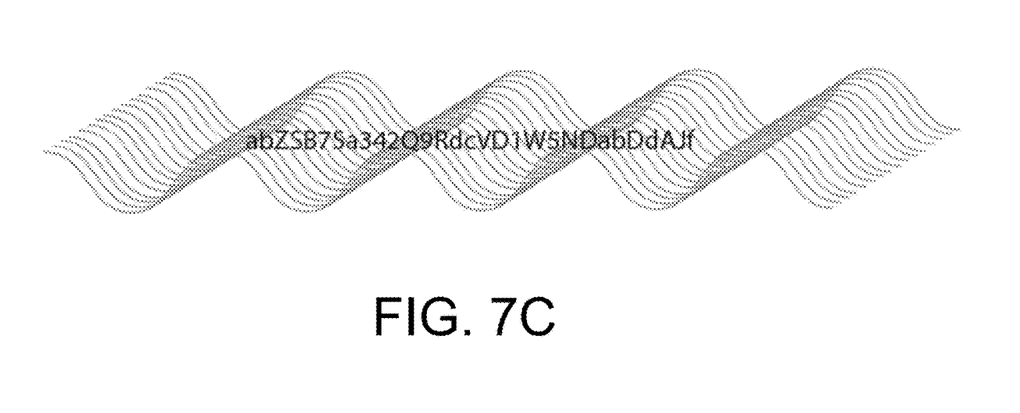
FIG. 7C is another example of a compiled multi-layer watermark using the layers in FIGS. 7A and 7B.

FIGS. 7A to 7C illustrate another example of the multi-layered watermark described herein. FIG. 7A illustrates a base layer in this example that will act as a background with the one or more symbols (i.e., data to be protected) positioned on top and centered. FIG. 7B illustrates a braid layer in this example that has an opacity of 100% and has holes comprising circular-shaped voids repeated in a horizontal line; creating an illusion that the watermark is braided between the characters. FIG. 7C illustrates a compiled version of the multi-layered watermark of this example.

Figure 8A:
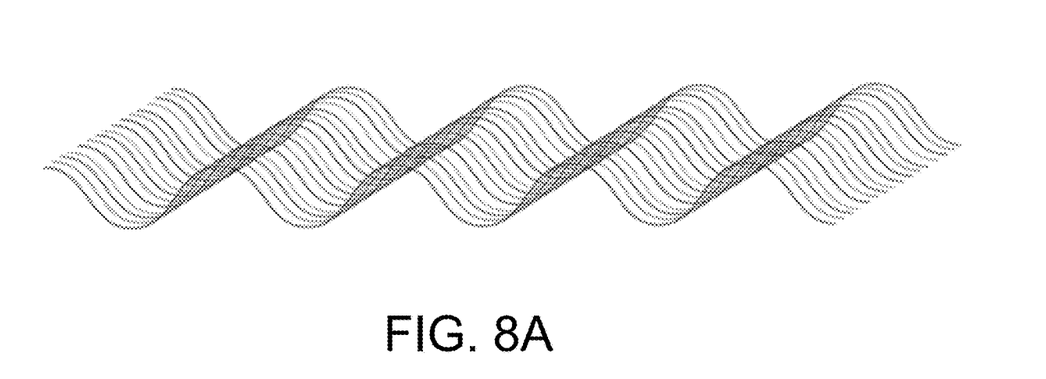
FIG. 8A is another example of a braid layer of a multi-layer watermark.
Figure 8B:
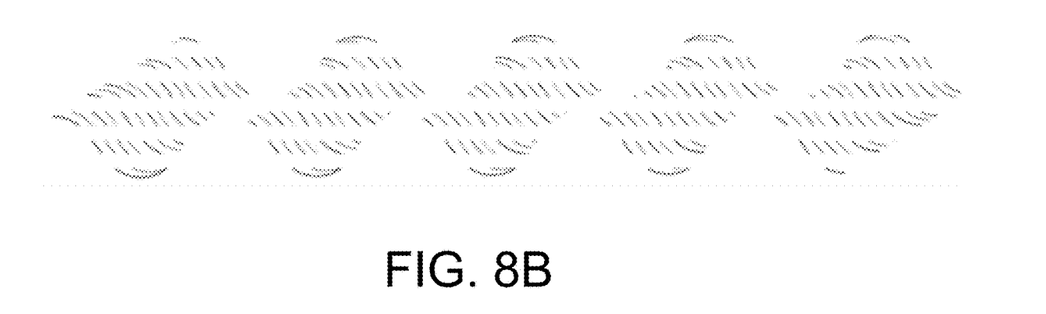
FIG. 8B is another example of a base layer of the multi-layer watermark.
Figure 8C:
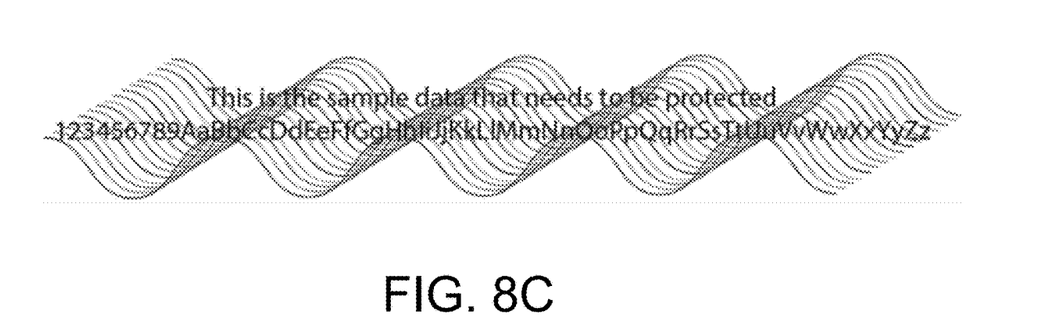
FIG. 8C is another example of a compiled multi-layer watermark using the layers in FIGS. 8A and 8B.

FIGS. 8A to 8C illustrate another example of the multi-layered watermark described herein. FIG. 8A illustrates a base layer in this example that will act as a background with the one or more symbols (i.e., data to be protected) positioned on top and centered. FIG. 8B illustrates a braid layer, in this example, that has an opacity of 50% and has a series of horizontal voids; creating an illusion that the watermark is braided between the characters. FIG. 8C illustrates a compiled version of the multi-layered watermark of this example.

Figure 9A:
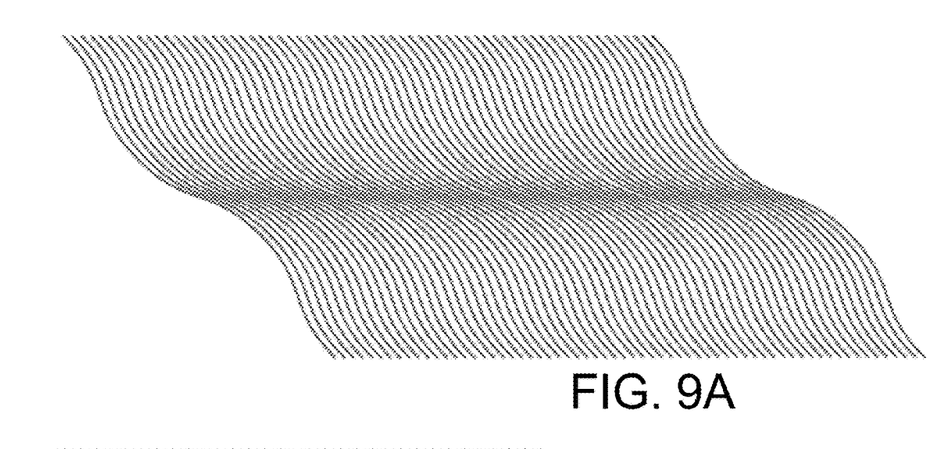
FIG. 9A is another example of a braid layer and a base layer combined to form a multi-layer watermark.
Figures 9B, 9C:
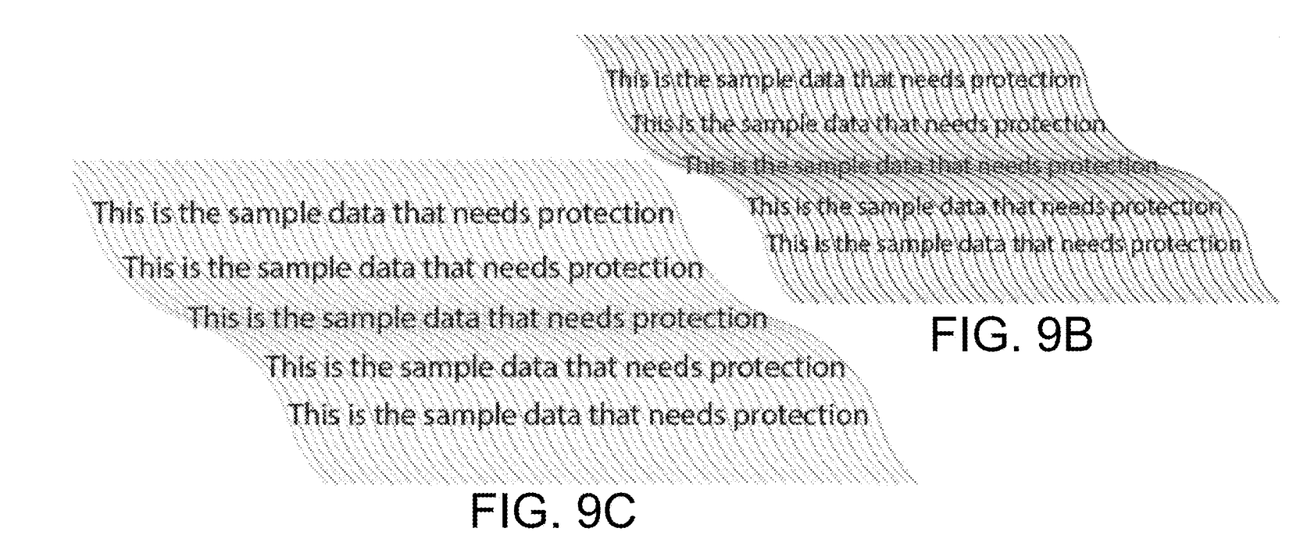
FIGS. 9B and 9C are other examples of a compiled multi-layer watermark using the layers in FIG. 9A.

FIGS. 9A to 9C illustrate another example of the multi-layered watermark described herein. FIG. 9A illustrates a combination of base layer and a braid layer for this example. In this example, the base layer and braid layer consist of alternating lines; the base layer having the odd numbered lines (lines 1, 3, 5, 7, etc.) and the braid layer having the even numbered lines (lines 2, 4, 6, 8, etc.). The base layer acts as a background with the one or more symbols (i.e., data to be protected) positioned on top and centered. FIGS. 9B and 9C illustrate a compiled version of the multi-layered watermark of this example creating an illusion that the watermark is braided between the characters. The braid layer can have a 50% opacity to allow the one or more symbols to be legible.

Figure 10:
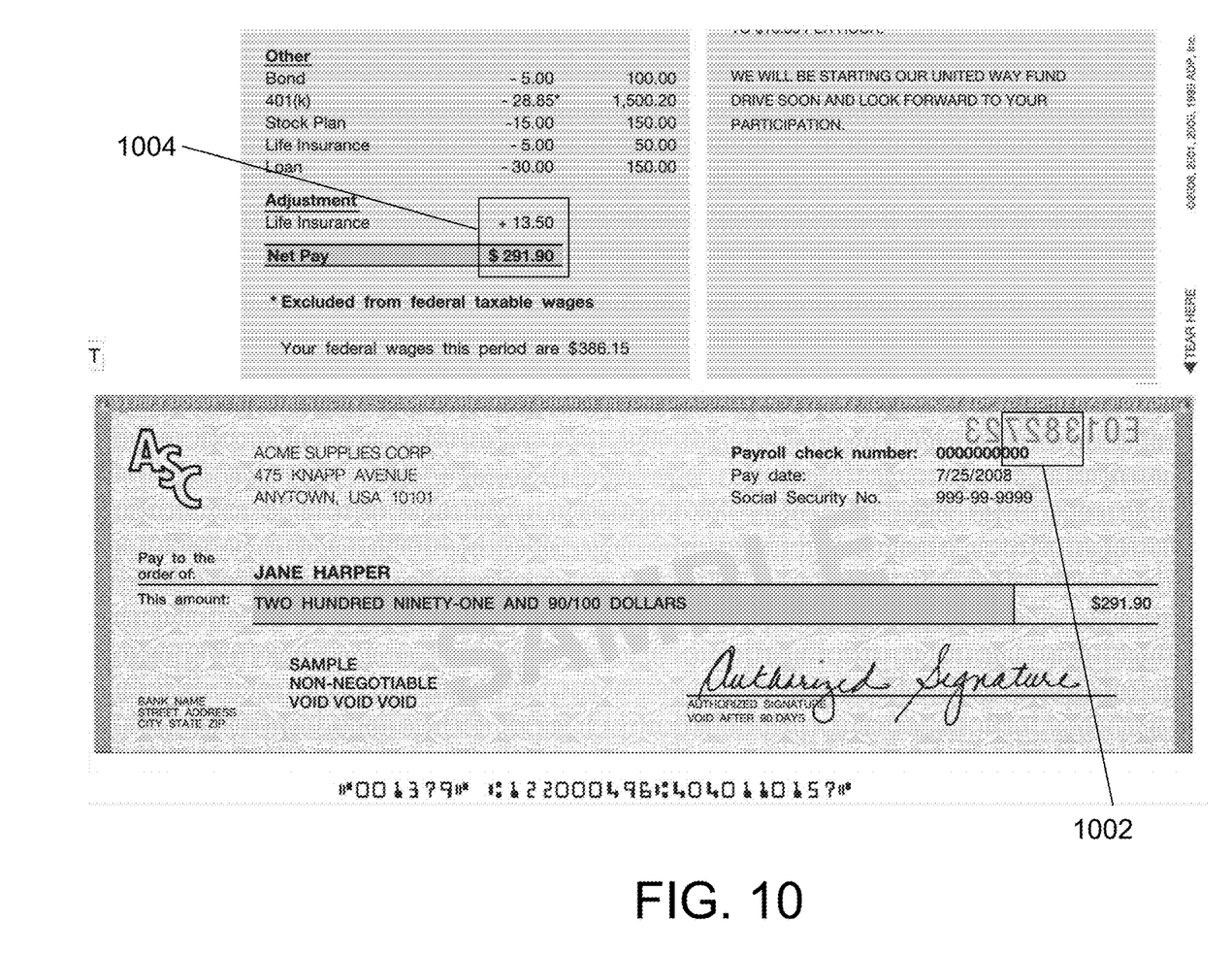
FIG. 10 illustrates an example of a payslip and paycheque using other approaches where a series of horizontal lines are used as a watermark behind text.
Figure 11:
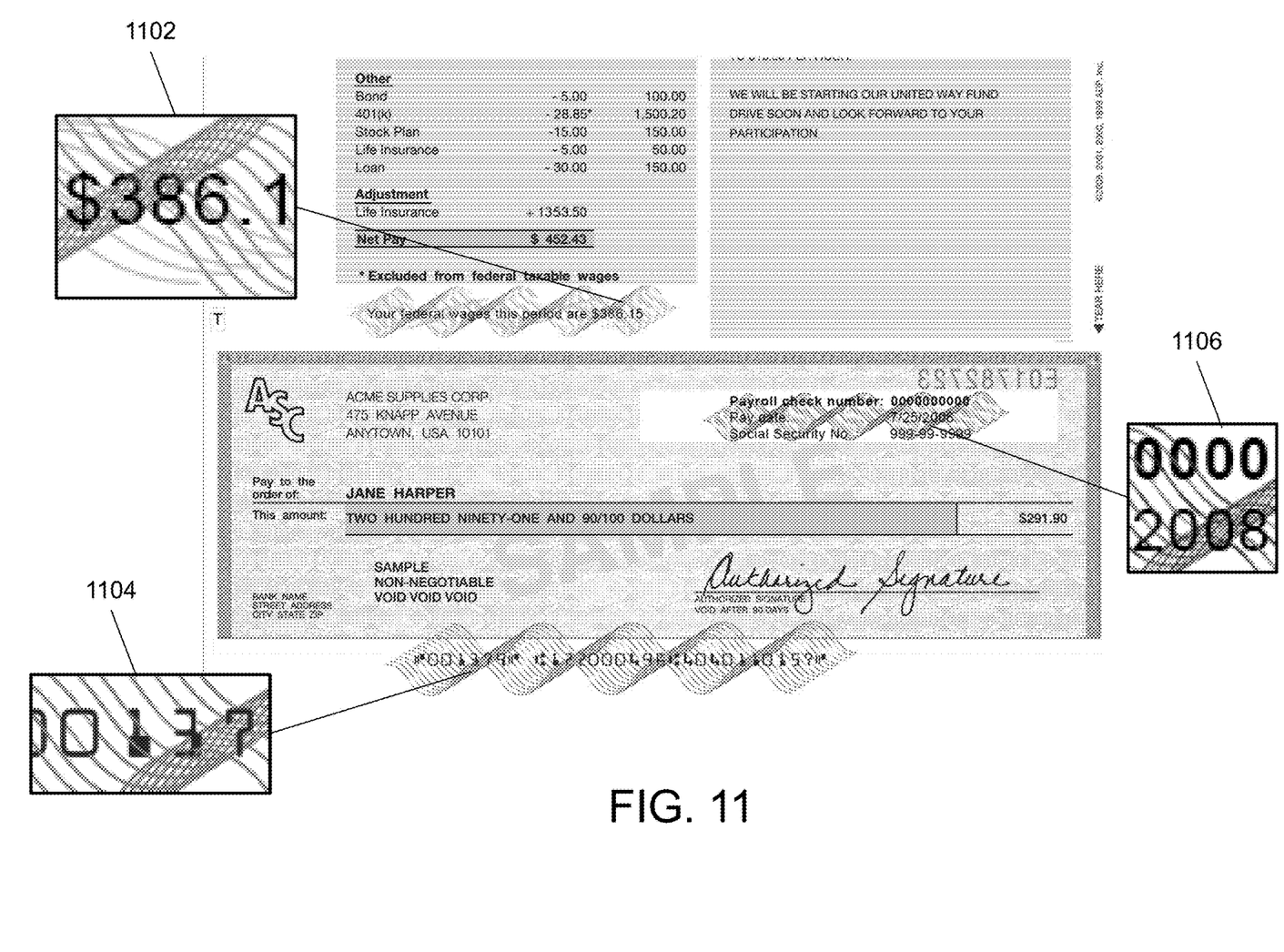
FIG. 11 illustrates an example of a payslip and paycheque using a multi-layered watermark consisting of wavy-braided lines.

FIGS. 10 and 11 illustrate an example of a payslip and paycheque using other approaches and the multi-layered watermark of the present disclosure, respectively. In FIG. 10, as shown in the highlighted section 1004 of the payslip, a series of horizontal lines are used as a watermark behind the text. Also in FIG. 10, as shown in the highlighted section 1002 of the paycheque, a repeating geometric shape is used as a watermark behind the text. In both cases, the watermark does not pose a significant challenge for an unscrupulous actor to modify the characters printed overtop of the watermark. For example, simple copying sections of the watermark without characters overtop, pasting such sections overtop of the characters to be modified, and then re-typing the new characters overtop of the pasted sections.

FIG. 11 illustrates an example of using multi-layered watermarks, for the payslip and paycheque, consisting of wavy-braided lines. As exemplified in the enlarged sections 1102, 1104, and 1106, the base layer of the multi-layered watermark is located below the characters while the braid layer is located above the characters; the braid layer having holes to give the appearance of the wavy lines braiding above and below the characters. Once printed (or digitally flattened), inconspicuously modifying the characters becomes immensely difficult; especially relative to the watermark under the characters exemplified in FIG. 10. At least due to the complexity of the lines, and the fact that there is braiding with the characters, any attempt at modification or replacement of the characters would be conspicuously noticeable by a viewer authenticating the payslip and paycheque.

TABLE 1 illustrates pseudocode for an example implementation of the system 100. In this example, floating tables are created in the footer of each page of a PDF document for insertion of the multi-layered watermark.

TABLE 1

Upon creation of the document, instructions in a header of each page is included to anticipate floating tables within a footer of the page. Settings for the tables include no borders with horizontal and vertical alignments matching one another. Exemplified in the pseudocode below:

```
#region
    Table tblfooter = new Table(new float[ ] { 150, 10 }).UseAllAvailableWidth( );
    Image imga = new
Image(ImageDataFactory.Create(System.Web.Hosting.HostingEnvironment.MapPath("~\\Con
tent\\Images\\Layer A (12).png")));
    Cell cell1 = new Cell( );
    cell1.SetHeight(100);
    cell1.SetWidth(500);
    // Call first layer of image event
    cell1.SetNextRenderer(new ImageAndPositionRenderer(cell1, imga,
    "Hash: " + allNotes.ListuserDetails.HashCode));
    tblfooter.AddCell(cell1.SetBorder(Border.NO_BORDER));
    cell = new Cell(1, 2);
```

TABLE 1-continued

```
  Text hashText = new Text("").SetFont(bold);
  cell.Add(new Paragraph(hashText)).SetBorder(Border.NO_BORDER);
  cell.SetWidth(UnitValue.CreatePercentValue(40));
  tblfooter.AddCell(cell);
  Outerlast = new Cell(2, 1).Add(new
Paragraph("")).SetBorder(Border.NO_BORDER);
  tblOuterlast.AddCell(Outerlast);
  Outerlast = new Cell(2, 3).Add(tblfooter).SetBorder(Border.NO_BORDER);
  Outerlast.SetHorizontalAlignment(HorizontalAlignment.LEFT);
  tblOuterlast.AddCell(Outerlast);
  #endregion
  tblOuterlastFooter = tblOuterlast;
  // call footer event to draw second layer of image
  pdfDoc.AddEventHandler(PdfDocumentEvent.END_PAGE, new
PdfEventHandlerFooter(tblOuterlastFooter));
  #endregion
  // END
```

At the end of the document, provided is a reminder of an instance as a base layer watermark (i.e., watermark) event with anticipation to adding the watermark images within the floating tables which are positioned precisely upon each other, with the has text in between them. In this case, the watermark image is called from a server (i.e., running the system 100). According to the page dimensions and margins, the base layer is prepared for placement within the first layer table. Exemplified in the pseudocode below:

```
#region PdfHeader to draw water mark in page
    /// <summary>
    /// Pdf Header
    /// </summary>
    private class PdfEventHandlerHeader : IEventHandler
    {
      private Table table;
      public PdfEventHandlerHeader(Table table)
      {
        this.table = table;
      }
      public void HandleEvent(Event currentEvent)
      {
        PdfDocumentEvent docEvent = (PdfDocumentEvent)currentEvent;
        PdfDocument pdfDoc = docEvent.GetDocument( );
        PdfPage page = docEvent.GetPage( );
        PdfExtGState gState = new PdfExtGState( ).SetFillOpacity(0.4f);
        ImageData waterMark =
ImageDataFactory.Create(System.Web.Hosting.HostingEnvironment.MapPath("~\\Content\\Images\\rsz_impwatermark1.png"));
        float w = waterMark.GetWidth( ) - 50;
        float h = waterMark.GetHeight( );
        iText.Kernel.Geom.Rectangle pageSize = page.GetPageSize( );
        float lx = (pageSize.GetLeft( ) + pageSize.GetRight( )) / 2;
        float ly = (pageSize.GetTop( ) + pageSize.GetBottom( )) / 2;
        PdfCanvas over = new PdfCanvas(page);
        over.SaveState( ).SetExtGState(gState);
        over.AddImage(waterMark, w, 0, 0, h, lx - (w / 2), ly - (h / 2), true);
        over.RestoreState( );
        over.Release( );
        PdfExtGState gStateHeader = new PdfExtGState( ).SetFillOpacity(1.0f);
        PdfCanvas canvas = new PdfCanvas(page.NewContentStreamBefore( ),
page.GetResources( ), pdfDoc);
        string type = docEvent.GetEventType( );
        if (type == "StartPdfPage")
        {
          new Canvas(canvas, pdfDoc, new iText.Kernel.Geom.Rectangle(36, 580,
page.GetPageSize( ).GetWidth( ) - 72, 230)).Add(table).Close( );
          canvas.SaveState( ).SetExtGState(gStateHeader);
        }
        else
        {
          i = i + 1;
          if (i != numberOfPages)
          {
            new Canvas(canvas, pdfDoc, new iText.Kernel.Geom.Rectangle(36, 10,
page.GetPageSize( ).GetWidth( ) - 72, 120)).Add(table).Close( );
            canvas.SaveState( );
          }
        }
      }
    }
    #endregion
```

TABLE 1-continued

The watermark image base layer is placed within the table and the text placed directly over top. Following this, the second layer of the watermark which includes either discolorations in a pattern or holes in a pattern is placed directly into a floating table over top of the hash image, with the background table, hash value text, and watermark beneath that. Exemplified in the pseudocode below:

```
#region Draw Second layer of image
    /// <summary>
    /// Draw first layer of image and text over over the image
    /// </summary>
    private class ImageAndPositionRenderer : CellRenderer
    {
      private Image img;
      private String content;
      public ImageAndPositionRenderer(Cell modelElement, Image img, String content)
        : base(modelElement)
      {
        this.img = img;
        this.content = content;
      }
      // If renderer overflows on the next area, iText uses getNextRender( ) method to create
a renderer for the overflow part.
      // If getNextRenderer isn't overriden, the default method will be used and thus a
default rather than custom
      // renderer will be created
      public override IRenderer GetNextRenderer( )
      {
        return new ImageAndPositionRenderer((Cell)modelElement, img, content);
      }
      public override void Draw(DrawContext drawContext)
      {
        //draw image and text
        base.Draw(drawContext);
        Rectangle area = GetOccupiedAreaBBox( );
        img.ScaleAbsolute(240, 55);
        drawContext.GetCanvas( ).AddXObject(img.GetXObject( ),
           178, 10, img.GetImageWidth( ) *
img.GetProperty<float>(Property.HORIZONTAL_SCALING));
        drawContext.GetCanvas( ).Stroke( );
        Paragraph p = new Paragraph(content);
        float x, y;
        TextAlignment? alignment;
        x = 296; y = 30; alignment = TextAlignment.CENTER;
        new Canvas(drawContext.GetCanvas( ), drawContext.GetDocument( ),
area).ShowTextAligned(p.SetFontSize(9).SetBorder(Border.NO_BORDER), x, y, alignment);
      }
    }
    #endregion
```

Following this, the multi-layered watermark is placed into the background table of every page of the document. Exemplified in the pseudocode below:

```
#region PdfFooter First layer of image
    /// <summary>
    /// PdfFooter
    /// </summary>
    private class PdfEventHandlerFooter : IEventHandler
    {
      private Table table;
      public PdfEventHandlerFooter(Table table)
      {
        this.table = table;
      }
      public void HandleEvent(Event currentEvent)
      {
        PdfDocumentEvent docEvent = (PdfDocumentEvent)currentEvent;
        PdfDocument pdfDoc = docEvent.GetDocument( );
        PdfPage page = docEvent.GetPage( );
        PdfCanvas canvas = new PdfCanvas(page.NewContentStreamBefore( ),
page.GetResources( ), pdfDoc);
        string type = docEvent.GetEventType( );
        if (type == "StartPdfPage")
        {
          new Canvas(canvas, pdfDoc, new iText.Kernel.Geom.Rectangle(36, 580,
page.GetPageSize( ).GetWidth( ) - 72, 230)).Add(table).Close( );
          canvas.SaveState( );
        }
```

TABLE 1-continued

```
        else
        {
            PdfExtGState gState = new PdfExtGState( );
            ImageData HashImage =
ImageDataFactory.Create(System.Web.Hosting.HostingEnvironment.MapPath("~\\Content\\I
mages\\Layer B (7).png"));//Hash-Layers.png //WatermarkImg WaterMarkExample
            float w = HashImage.GetWidth( ) - 720;
            float h = HashImage.GetHeight( ) - 166;
            iText.Kernel.Geom.Rectangle pageSize = page.GetPageSize( );
            float lx = (pageSize.GetLeft( ) + pageSize.GetRight( )) / 2;
            float ly = (pageSize.GetTop( ) + pageSize.GetBottom( )) / 2;
            PdfCanvas over = new PdfCanvas(page);
            over.SaveState( ).SetExtGState(gState);
            over.AddImage(HashImage, w, 0, 0, h, lx - (w / 2), 10, true);
            over.RestoreState( );
            over. Release( );
            PdfExtGState gStateFooter = new PdfExtGState( );
            new Canvas(canvas, pdfDoc, new iText.Kernel.Geom.Rectangle(36, 10,
page.GetPageSize( ).GetWidth( ) - 72, 120)).Add(table).Close( );
            canvas.SaveState( ).SetExtGState(gStateFooter);
            canvas.RestoreState( );
            canvas. Release( );
        }
    }
}
#endregion
```

A QR image is then generated with a bitmap for specific hash value correlating to the one or more symbols for every page of the document. Exemplified in the pseudocode below:

```
#region Generate QR code
    public byte[ ] GenerateQRCode(string qrcode = "")
    {
        using (MemoryStream ms = new MemoryStream( ))
        {
            QRCodeGenerator qrGenerator = new QRCodeGenerator( );
            QRCodeGenerator.QRCode qrCode = qrGenerator.CreateQrCode(qrcode,
QRCodeGenerator.ECCLevel.Q);
            using (System.Drawing.Bitmap bitMap = qrCode.GetGraphic(20))
            {
                bitMap.Save(ms, System.Drawing.Imaging.ImageFormat.Png);
                return ms.ToArray( );
            }
        }
    }
#endregion
```

Although the invention has been described with reference to certain specific embodiments, various other aspects, advantages and modifications thereof will be apparent to those skilled in the art without departing from the spirit and scope of the invention as outlined in the claims appended hereto. The entire disclosures of all references recited above are incorporated herein by reference.

The invention claimed is:

1. A computer-implemented method for generating a multi-layered watermark with one or more symbols for placement on a document, the method comprising:
   positioning a base layer of the multi-layered watermark at one or more locations on the document;
   positioning the one or more symbols of the multi-layered watermark overtop of at least a portion of the base layer;
   positioning a braid layer of the multi-layered watermark overtop of the document, the braid layer and the base layer are substantially aligned, the braid layer comprising a copy of the base layer incorporating a pattern; and
   outputting the multi-layered watermark for placement on the document.

2. The method of claim 1, wherein the base layer and the braid layer comprise multiple lines together forming a wavy design.

3. The method of claim 1, wherein the base layer and the braid layer comprise multiple lines together forming a braided design.

4. The method of claim 1, wherein the pattern comprises a plurality of holes or areas of opacity positioned in association with each of the one or more symbols.

5. The method of claim 4, wherein the holes or areas of opacity are positioned over only a portion of each of the one or more symbols.

6. The method of claim 2, wherein the wavy design comprises the base layer and the braid layer forming alternating lines of the wavy design.

7. The method of claim 1, wherein the pattern comprises discoloration positioned in association with each of the one or more symbols.

8. The method of claim 1, further comprising positioning at least one further braid layer of the multi-layered watermark overtop of the document.

9. The method of claim 1, further comprising generating and positioning a machine-readable optical encoding on the document, the machine-readable optical encoding comprising a hashed encoding of the one or more symbols, the hashed encoding usable to authenticate validity of the multi-layered watermark by matching the one or more symbols to the one or more symbols that are hashed encoded in the machine-readable optical encoding.

10. The method of claim 1, further comprising digitally flattening the base layer, the one or more symbols, and the braid layer.

11. A system for generating a multi-layered watermark with one or more symbols for placement on a document, the system comprising one or more processors in communication with a data storage to receive instructions to execute a watermark module to:
- position a base layer of the multi-layered watermark at one or more locations on the document;
- position the one or more symbols of the multi-layered watermark overtop of at least a portion of the base layer;
- position a braid layer of the multi-layered watermark overtop of the document, the braid layer and the base layer are substantially aligned, the braid layer comprising a copy of the base layer incorporating a pattern; and
- output the multi-layered watermark for placement on the document.

12. The system of claim 11, wherein the base layer and the braid layer comprise multiple lines together forming a wavy design.

13. The system of claim 11, wherein the base layer and the braid layer comprise multiple lines together forming a braided design.

14. The system of claim 11, wherein the pattern comprises a plurality of holes or areas of opacity positioned in association with each of the one or more symbols.

15. The system of claim 14, wherein the holes or areas of opacity are positioned over only a portion of each of the one or more symbols.

16. The system of claim 12, wherein the wavy design comprises the base layer and the braid layer forming alternating lines of the wavy design.

17. The system of claim 11, wherein the pattern comprises discoloration positioned in association with each of the one or more symbols.

18. The system of claim 11, wherein the multi-layered watermark module further positions at least one further braid layer of the multi-layered watermark overtop of the document.

19. The system of claim 11, wherein the one or more processors further executes a coding module to generate and position a machine-readable optical encoding on the document, the machine-readable optical encoding comprising a hashed encoding of the one or more symbols, the hashed encoding usable to authenticate validity of the multi-layered watermark by matching the one or more symbols to the one or more symbols that are hashed encoded in the machine-readable optical encoding.

20. The system of claim 11, wherein the multi-layered watermark module further digitally flattens the base layer, the one or more symbols, and the braid layer.

\* \* \* \* \*